June 18, 1957  M. RUBLI  2,796,166
APPARATUS FOR CONVEYING WELDING ELECTRODES
THROUGH A DRYING STOVE
Filed Feb. 26, 1953
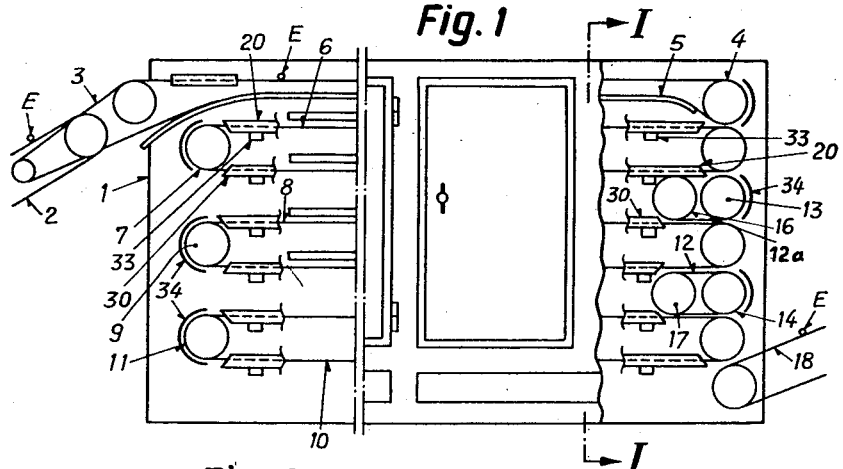
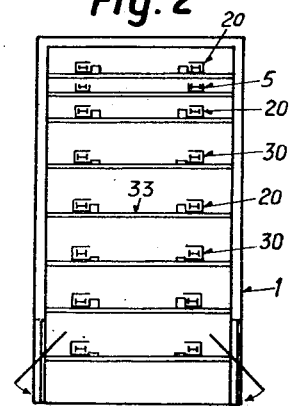
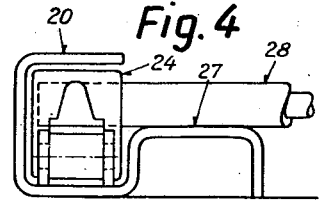
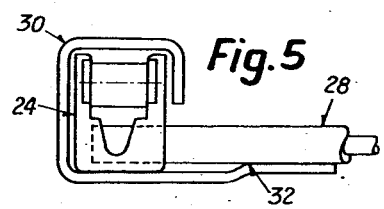
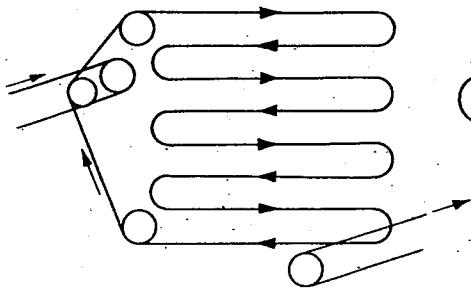
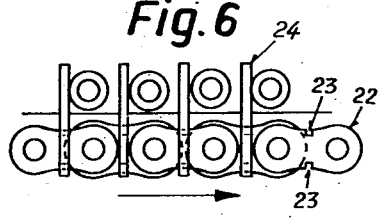
INVENTOR:
MAX RUBLI ent Office 2,796,166
Patented June 18, 1957

2,796,166

APPARATUS FOR CONVEYING WELDING ELECTRODES THROUGH A DRYING STOVE

Max Rubli, Zumikon, Zurich, Switzerland, assignor to Holding Intercito S. A., Zurich-Oerlikon, Switzerland Application February 26, 1953, Serial No. 338,932

Claims priority, application Switzerland February 27, 1952

5 Claims. (Cl. 198—159)

This invention relates to an apparatus for conveying cylindrical coated electrodes and the like through a chamber, said electrodes being rolled continuously during transport for uniformity of treatment within said chamber.

The method is known of conveying welding electrodes through a drying enclosure by means of endless conveyor means; it is also known practice to rotate the electrodes about their own axes at intervals as they proceed through the enclosure, to which end a friction surface pressing against the shells of the electrodes is disposed in the path of the latter, so that the electrodes are pressed against their support and are thereby compelled to turn upon their own axes, the electrodes rolling backwards on the conveyor belts. This arrangement has the drawbacks that the electrodes, owing to the rearward movement on the conveyor means, such as chains or belts, are detained and rub against one another, and that owning to this reciprocal pressure the shells of the electrodes at least suffer and are damaged. For this reason, in the arrangement described the rotation of the electrodes occurs only at intervals, and for brief periods. In addition, there is no guarantee that the electrodes will turn into a new position favourable to the process of drying.

The object of the present invention is to provide a conveyor apparatus leading through a drying enclosure or chamber, in which conveyor apparatus the electrodes rotate about their axes, simultaneously avoiding the aforesaid drawbacks. The invention resides in the fact that the conveyor means comprises two endless chains located on the same plane, parallel to one another, and advancing at the same speed, the links of said chains being provided with driver members each serving to propel one electrode, and that rolling-contact rails are so disposed alongside and parallel to the chains that the electrodes rest only on the said rails and are only propelled by the driver members, so that during their passage through the enclosure the electrodes roll along on the rails. Needless to say, instead of chains, belts to which driver members are secured can be used. This arrangement enables the forward and return travel of the chains to be utilized. It is possible to dispose a plurality of loops of chain one above the other, with a common drive, between which loops, at their ends, transfer means are provided. It is also possible, however, to use for the entire conveying distance through the enclosure a single pair of chains describing a serpentine or zigzag path. The electrodes roll along on the rails over the entire distance, except at the chain reversing stations, without suffering damage.

In the accompanying drawing two typical embodiments of the arrangement are illustrated. In the drawing:

Fig. 1 shows the charging end and the discharge end of a drying stove or enclosure, partly in longitudinal section;

Fig. 2 is a cross-sectional view taken along line I—I of Fig. 1;

Fig. 3 shows schematically the serpentine or zigzag path of a single pair of chains;

Fig. 4 is a cross-sectional view of a chain with driver members, and also of a rail for guiding the upper thrum of a chain loop;

Fig. 5 is a cross-sectional view of a chain with driver member and of a rail for guiding the lower thrum of a loop of chain;

Fig. 6 shows the chain with the driver members placed in position, as viewed from the side; and Fig. 7 is an elevational view of a driven member.

The oven, or enclosure 1 is supplied with electrodes E by the conveyor belt 2, said electrodes being taken over by the pair 3 of conveyor chains. The pair 3 of conveyor chains is driven by two chain wheels 4 mounted on a shaft, and on its return journey runs along the guide rail 5. A second pair 6 of conveyor chains is driven by the chain wheels 7, a third pair 8 by the chain wheels 9, and a fourth pair of chains by the chain wheels 11. Between the pairs 6 and 8 and between the pairs 8 and 10 of chains, transfer chains 12 and 12a are disposed which are driven by the chain wheels 13 and 14 and run over the chain tensioning sprockets 16 and 17. From the pair 10 of chains the electrodes are conveyed by a discharge belt 18 to the inspection station. Profiled rails 20 and 30, secured to cross bars 33, form casings and serve to guide in the latter the chains and support the electrode rods. The profiled rails 20 and 30 are of such cross-section that the chain is completely enclosed on three sides, whilst the fourth side presents a longitudinal slot for the passage of the electrodes and a longitudinal rolling-contact surface for the support of the same.

The upper thrum or section of each loop of chain is guided in a profiled rail 20 as shown in Fig. 4. The links 22 of the chains are provided with recesses 23. The driver members 24 take the form of spring clips, as seen in Fig. 7, which are stamped out of sheet steel and hardened, and whose teeth 24a engage the recesses 23 of the chain links. The profiled rails 20 are provided with outwardly projecting ribs each forming a rolling-contact surface 27 which projects beyond the links of the chain located in the profiled rail so that the electrodes rest on an offset rolling-contact surface only and are merely propelled by the appurtenant driver members 24. Since the line of contact of the electrodes with the driver-members is substantially smaller than the line of contact on the rolling-contact surface 27 of the profiled rails 20, i. e. the effective width of the driving members is less than that of the contact surfaces, the friction on the driver-members is smaller, so that the electrode rods 28 roll along on the rolling-contact surfaces 27. In the lower part of the chain loop the driver members project downwards, so that the chains, supported by the said driver members, run in the profiled rail 30, which has a rolling-contact surface 32 on which the electrode rods roll along without touching the chain links.

Fig. 3 shows, in contrast to Fig. 1, a conveying apparatus having a pair of chains proceeding through the entire stove and guided along a serpentine path in the said stove. In this apparatus the transfer means 12 and 12a, as shown in Fig. 1, are not necessary, it merely being necessary to provide sheet-metal guides 34 at the reversing stations, as also shown in Fig. 1. The serpentine loops need not be horizontal; they may also be slightly inclined, thereby giving the electrodes a tendency to roll along.

Having thus described the invention, what is claimed as new and desired to be secured by Letters Patent, is:

1. In an apparatus for conveying cylindrical electrodes and like elongated objects through a chamber; a pair of parallel spaced conveyors, a pair of complementary profiled rails, each of said profiled rails forming a casing provided with a longitudinal slot facing its complementary rail, further provided with a longitudinal contact surface extending from the respective casing toward its complementary rail, said conveyors being accommodated within said casings of said rails, respectively, and pairs of driving members spaced along and operatively connected to said conveyors, respectively, and located within said casings of said rails for entraining said electrodes during movement of said conveyors, the linear contact of said electrodes with said driving members being lesser than that with said contact surfaces, respectively, whereby upon moving said conveyors with electrodes inserted between said driving members and seated on said contact surfaces of said complementary rails, said electrodes are entrained by said driving members and caused to roll continuously and uniformly along said contact surfaces on account of the greater frictional force of said electrodes with said contact surfaces than with said driving members.

2. An apparatus according to claim 1, said driving members comprising clips stamped from sheet steel and having resilient, parted projections, said conveyors being provided with recesses in which the projections of the driving members engage.

3. An apparatus according to claim 1, each of said rails comprising a substantially square-shaped casing; wherein each of the facing sides of complementary rails has a continuous slot and a rib projecting outwards at right angles to the respective side, which rib serves as said contact surface.

4. An apparatus according to claim 3, said ribs including offset portions, thereby maintaining said electrodes out of contact with said conveyors.

5. In an apparatus for treating electrodes and like elongated elements in a chamber; parallel and spaced apart endless conveyor sections, upper and lower sections, respectively, pairs of profiled complementary rails for housing respective sections of said conveyor, each of said profiled rails being provided with a longitudinal slot, said pairs of rails being provided with offset contact surfaces located intermediate each pair of rails, said slots of each rail pair facing each other and being disposed spaced from the respective conveyor sections when housed in said profiled rails, and movable members spaced from each other and connected to said conveyors and accommodated in said profiled rails, respectively, adjacent said slots, the effective width of said movable members being less than that of said offset contact surfaces, whereby electrodes carried between complementary rails will be entrained by said movable members when positioned therebetween to roll continuously along said contact surfaces of said complementary rails of said upper and lower conveyor sections.

References Cited in the file of this patent

UNITED STATES PATENTS

| | | |
|---|---|---|
| 415,386 | Hipperling | Nov. 19, 1889 |
| 498,358 | Merrill et al. | May 30, 1893 |
| 1,294,675 | Kiner | Feb. 18, 1919 |
| 1,297,569 | Johnson | Mar. 18, 1919 |
| 1,891,425 | Kronquist | Dec. 20, 1932 |
| 2,071,541 | Klourman | Feb. 23, 1937 |
| 2,608,288 | Talbot | Aug. 26, 1952 |

FOREIGN PATENTS

| | | |
|---|---|---|
| 465,462 | Canada | May 30, 1950 |